(12) United States Patent
Helfman et al.

(10) Patent No.: US 7,519,573 B2
(45) Date of Patent: Apr. 14, 2009

(54) SYSTEM AND METHOD FOR CLIPPING, REPURPOSING, AND AUGMENTING DOCUMENT CONTENT

(75) Inventors: Jonathan Helfman, Half Moon Bay, CA (US); Laurent Denoue, Palo Alto, CA (US); Elizabeth F. Churchill, San Francisco, CA (US); Lester D. Nelson, Santa Clara, CA (US)

(73) Assignee: Fuji Xerox Co., Ltd., Minato-ku, Tokyo (JP)

( * ) Notice: Subject to any disclaimer, the term of this patent is extended or adjusted under 35 U.S.C. 154(b) by 545 days.

(21) Appl. No.: 10/924,098

(22) Filed: Aug. 23, 2004

(65) Prior Publication Data

US 2006/0041589 A1 Feb. 23, 2006

(51) Int. Cl.
*G06F 7/00* (2006.01)
*G06F 17/30* (2006.01)
*G06F 17/00* (2006.01)

(52) U.S. Cl. .................................. 707/1; 707/104.1
(58) Field of Classification Search .................. 707/3, 707/10, 104.1, 1, 6; 715/512, 838; 345/156
See application file for complete search history.

(56) References Cited

U.S. PATENT DOCUMENTS

| | | | | |
|---|---|---|---|---|
| 6,366,923 | B1 * | 4/2002 | Lenk et al. | 707/104.1 |
| 6,732,142 | B1 * | 5/2004 | Bates et al. | 709/203 |
| 2002/0038299 | A1 * | 3/2002 | Zernik et al. | 707/3 |
| 2003/0050860 | A1 * | 3/2003 | Janakiraman et al. | 705/27 |
| 2005/0012757 | A1 * | 1/2005 | Park et al. | 345/582 |
| 2005/0138033 | A1 * | 6/2005 | Katta et al. | 707/10 |
| 2005/0183004 | A1 * | 8/2005 | Lerner et al. | 715/512 |
| 2005/0195157 | A1 * | 9/2005 | Kramer et al. | 345/156 |

OTHER PUBLICATIONS

SnagIt Screen Capture & Camtasia Studio Screen Recorder from TechSmith, p. 1, printed: Apr. 21, 2005.
MicroSoft Office Online, OneNote 2003 Product Guide, Featuring Enhancements in OneNote 2003, Service Pack 1, printed: Apr. 21, 2004.
TechSmith, SnagIt, Getting Started Guide, www.techsmith.com, pp. 1-16.
MicroSoft One Note 2003 Product Guide, pp. 1-42.
TechSmith, SnagIt, Online Help Guide, www.techsmith.com; pp. 1-319.

* cited by examiner

*Primary Examiner*—Don Wong
*Assistant Examiner*—Merilyn P Nguyen
(74) *Attorney, Agent, or Firm*—Fliesler Meyer LLP

(57) ABSTRACT

A system and method for repurposing and augmenting document content by clipping, annotating, and reassembling portions of documents, and which may be used in an online or collaborative environment. As used herein the term "repurposing" includes packaging the online information in a manner so that it can be re-used by subsequent users for subsequent applications. An input device or menu referred to herein as a "clipbar" may be provided within a software application or in a kiosk environment that allows users to clip and annotate portions of online or other documents, while retaining both the document fragment's rendered image and its underlying structure. The clips thus created may be stored as collections (together with their associated user-specified and system-specified meta-data) in a form compatible with the other input documents. The collections can be immediately made available to other users in a collaborative fashion, and re-clipped as desired.

42 Claims, 9 Drawing Sheets

SYSTEM AND METHOD FOR CLIPPING, REPURPOSING, AND AUGMENTING DOCUMENT CONTENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is related generally to systems and methods for viewing and collecting online content, and specifically to a system and method for repurposing and augmenting document content by clipping, annotating, and reassembling portions of documents in a collaborative environment.

BACKGROUND

Almost all current Web-based technologies assume that the basic unit of Web information is a "Web page". Web browsers (for example Netscape Navigator and Internet Explorer) provide facilities for displaying, printing, and saving individual Web pages. Web search engines (for example Yahoo and Google) maintain indexes and can provide links to those Web pages. This bias towards providing content as largely static Web pages favors the original authors and publishers of the Web content, who are free to determine exactly what constitutes a Web page. However, the actual users (i.e. the readers) of the Web page are often interested in only a portion of a Web page (for example, a portion that includes the desired information but excludes any unwanted advertisements). Additionally, for many tasks, a user may be interested in comparing information between different portions of different Web pages. For example, when shopping online for a product or service, the information required to make a truly informed purchase may be distributed over several different pages, and at several different Web sites. A prospective purchaser may like to compare this information in a convenient manner, before making a purchase.

Many current Web browsers allow users to save links (typically referred to as Uniform Resource Locators or URLs) to selected Web pages in the form of a "bookmarks" or "favorites" file. Although the standard URL specification supports the use of named anchors (pointers that indicate an offset into a particular Web page), these anchors are determined by the Web page author when he/she creates the Web page. Traditional URLs or anchors cannot indicate which portion of the Web page a user might actually be interested in.

As an alternative, users may take notes by highlighting, copying, and pasting portions of the Web page text into a separate application or text editor. However, textual copying alone does not capture the visual context of the Web page. There are many instances in which preserving the manner in which the Web page is rendered may be critically important. For example, the colors, fonts, point sizes, column widths, graphical layout, image sizes, and word spacing may be important to preserve for historical or legal reasons. Graphic designers may be more interested in the graphical renderings of Web pages than in the actual content. For some pages with similar content, such as newspaper sites carrying major news stories, the graphical layout may be the expected way to distinguish brands. In addition, a rendered image may be a better way to store a document clip for human interaction. The visual context of a Web page layout may provide contextual cues for helping users to remember why they made a note in the first place. All of these factors suggest that a system that uses images of rendered documents is more generally useful than one that does not.

The above discussion largely describes Web pages as one form of document, however the techniques used for Web pages can also be used for other technologies. In general, many digital applications can be thought of as managing both a rendered document and its underlying structure. A spreadsheet program, for example, maintains an internal representation of the spreadsheet, while simultaneously supporting a user interface that lets people (users) view and edit the spreadsheet contents or data. People read, print, and interact with the rendered view of the spreadsheet, while the system translates selections and other interactions with the rendered representation into operations on the internal structure.

Some Web-based technologies allow users to take notes that preserve some of the graphical attributes of rendered Web pages, by copying a portion of the underlying Web page's HTML code. For example, a portion of a Web page may be highlighted in a Web browser application and then pasted into a Web page editor application such as Microsoft Word or Microsoft FrontPage. Portions of multiple pages can be similarly copied into the editor and the resulting Web page can then be saved on a Web server and shared with multiple users over the Web. However, this note-taking method does not preserve the actual rendered layout of the original source pages. The method is also inconvenient for users because it requires them to engage in a process of Web page authoring, (for example, care must be taken to copy and paste important portions of the underlying HTML code, such as the URLs associated with each source page and CSS styles and JavaScript functions that may be required to make the resulting HTML fragments render correctly), when ideally they should be allowed to focus simply on the task of reading and understanding the Web information.

In addition to the editor-style process described above, a number of technologies exist to allow users to clip and reuse just a portion of a Web page. Screen capture programs such as the SnagIt application allow for capturing a portion of a rendered document exactly as it appears on a user's display. Such screen capture programs, however, merely capture an image and have no ability to capture the underlying structure of any displayed document.

Notetaking and annotation systems, such as Microsoft's OneNote, NetSnippets, and the Xerox XLibris system, allow users to copy, save, and organize portions of documents, and to publish collections of "notes" or "snippets" as a Web page. These note taking systems are much like the "what you see is what you get" (WYSIWYG) HTML editors, such as Netscape's Composer, which allow a user to create a new Web page out of portions of existing Web pages. However, none of these systems provide any ability to simultaneously store images of a portion of the rendered source document, together with the underlying structure, which as described above may be absolutely critical in certain applications.

What is needed is a means by which portions or fragments of online content may be clipped for repurposing, augmenting, and reassembling to create new or modified documents. As used herein the term "repurposing" includes packaging the online information in a manner so that it can be re-used by subsequent users for subsequent applications. Additionally what is needed is a means for storing both the fragment of the underlying document structure and the image of the rendered document. Furthermore, the means for controlling such a system should be easily accessible to the user. The augmented or reassembled documents should be able to be readily made available in a collaborative environment, for subsequent review and re-clipping by the original and other users.

SUMMARY

In accordance with an embodiment of the present invention, a system and method are provided for repurposing and augmenting document content by clipping, annotating, and reassembling portions of documents, and which may be used in an online or collaborative environment. As used herein the term "repurposing" includes packaging the online information in a manner so that it can be re-used by subsequent users for subsequent applications. An input device or menu referred to herein as a "clipbar" (or ClipBar) may be provided within a software application or in a kiosk environment that allows users to clip and annotate portions of online or other documents, while retaining both the document fragment's rendered image and its underlying structure. The clips thus created may be stored as collections (together with their associated user-specified and system-specified meta-data) in a form compatible with the other input documents. The collections can be immediately made available to other users in a collaborative fashion, and re-clipped as desired.

DETAILED DESCRIPTION

Figure 1:
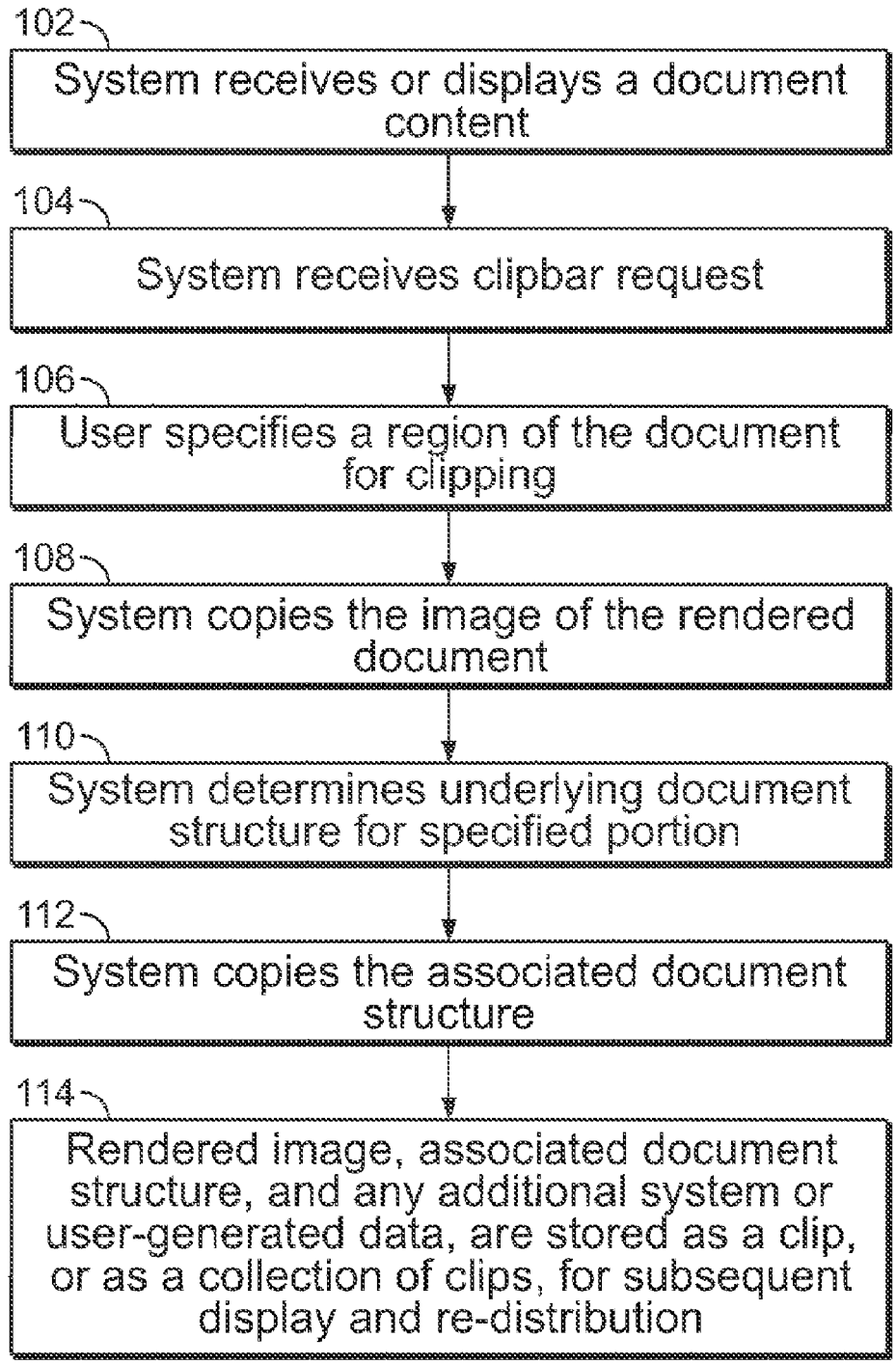
FIG. 1 shows a flowchart of a method in accordance with an embodiment of the invention for repurposing and augmenting document content by clipping, annotating, and reassembling portions of documents.

In accordance with an embodiment of the present invention, a system and method are provided for repurposing and augmenting document content by clipping, annotating, and reassembling portions of documents, and which may be used in an online or collaborative environment. As used herein the term "repurposing" includes packaging the online information in a manner so that it can be re-used by subsequent users for subsequent applications. An input device or menu referred to herein as a "clipbar" (or alternatively "ClipBar") may be provided within a software application (such as for example a browser application), or in a kiosk environment that allows users to clip and annotate portions of online or other documents, while retaining both the document fragment's rendered image and its underlying structure. The clips thus created may be stored as collections (together with their associated user-specified and system-specified meta-data) in a form compatible with the other input documents. The collections can be immediately made available to other users in a collaborative fashion, and re-clipped as desired.

As referred to herein a "document" may be considered to be a digital structure with at least one rendered form and method for translating interactions on the rendered form into operations on the structure. Examples of documents include but are not limited to Web pages, graphically rendered application windows, online purchasing systems, graphical menus, interactive kiosks, and other visual display screen systems such as the Plasma Poster Network system from the FX Palo Alto Laboratory. The clipbar allows people (users) to clip and annotate portions of rendered documents, while storing the clips as both representations of the rendered portion and representations of the associated underlying structure.

In accordance with an embodiment, whenever there is an explicit defined structure within a document that is accessible to the system (for example, through an application interface), this structure is accessed and used to create the clip. Whenever there is no explicit structure (for example, in the case of a displayed bitmap image), the system can determine a structure by analytical means, such as by character recognition, image segmentation, and similar image processing techniques. Depending on the particular implementation, the system can clip and capture portions of documents within an application either via an application programming interface (API) that has been specified for that application and document type, or, if no API is available then by some alternate means. Some applications, including for example Internet Explorer, provide a suitable API (for example, the Internet Explorer DOM) which can be used by the system for the clip/capture process. Other applications do not provide such a DOM or API. In those implementations in which an API is not available, the system can use a means such as Optical Character Recognition (OCR) to obtain a clip. From the perspective of the user, the result is similar in that the OCR'ed clip provides, for example, an ability to search clips by content, or the ability to extract portions of the clips. Using an application-independent extraction means such as OCR makes the ClipBar itself application independent.

Clipbar Usage

FIG. 1 shows a flowchart of a method in accordance with an embodiment of the invention for repurposing and augmenting document content by clipping, annotating, and reassembling portions of documents. In step 102, the system receives or displays a document content, i.e. a displayed image. Examples of such displayed images include Web pages, application screenshots, spreadsheets, and similar displays. This step may be performed, for example, by the user executing a Web browser application and retrieving into the browser a Web page. Typical examples of Web browser applications include Internet Explorer and Netscape Navigator. A Web page may be defined by HyperText Markup Language (HTML), Java Server Page (JSP), and by other languages. When retrieved into the Web browser, the browser application renders a visible representation of the HTML etc for viewing by the user. Other browser systems may perform in a similar fashion. In step 104, the system receives a request to use the clipbar. In step 106, the user specifies a region or portion of the rendered document for clipping. In the context of a Web browser application this step requires allowing the user to select, by graphical or other means, some portion of the rendered document, i.e. the image of the document in the browser. The user may be provided with a clipbar input or device for selecting the required portion. In step 108, the system copies an image of the rendered document or the selected portion of that document. (Depending on the implementation it may be said that the clipbar copies the image of the rendered document). This step may be performed by a clip capture logic or equivalent software programming. In step 110, the system determines the underlying structure for the specified portion, i.e. it determines elements of the content structure that correspond with the portion of the displayed image selected by the user. As described above, in accordance with an embodiment, whenever there is an explicit defined structure within a document that is accessible to the system (for example, through an application interface), this structure is accessed and used to create the clip. Whenever there is no explicit structure (for example, in the case of a displayed bitmap image), the system can determine a structure by analytical means, such as by character recognition, image segmentation, and similar image processing techniques. This step may be performed by an application mapping logic or equivalent software programming. In step 112 the system (i.e. the clipbar) copies the associated document structure. In the context of an HTML-based document this may include copying the relevant sections of HTML code that underly, or that correspond to, the selected image. In step 114, the rendered image and its associated document structure, together with any additional system or user-generated meta-data are stored as a clip, or as a collection of clips, for subsequent display and re-distribution. Clips may be stored in a database, or any equivalent repository, and may be stored either in a permanent or temporary format, depending on the particular implementation.

These steps are described in further detail below:

System Displays Document Content

In typical use the system allows a graphical content to be displayed to the user. For example, the system may include a computer with a display and a graphical user interface, such as a Personal Computer or a Windows system. The Windows system may include a software application or browser for retrieving and displaying HTML-based Web content, or Web documents. Depending on the particular embodiment, other types of graphical user interface or graphical display may be used. For example, in some embodiments the system may comprise a kiosk, together with a graphical display and either a keyboard or alternate means of input, that can be used by a user for browsing or "surfing" the Internet. A number of kiosks can communicate together for sharing of clips and clip collections. Other embodiments may include Portable Digital Assistants (PDAs) and other mobile devices.

User Specifies Region

In accordance with one embodiment, the system (i.e. the clipbar) allows for a user reading a document to use the familiar gesture of clicking and dragging a cursor with any standard input device (such as a mouse, touch pad, or trackball) over the rendered representation of the document to indicate a region of interest within that document. The clipbar may be displayed on the digital display or graphical user interface as a graphical device or toolbar. In some embodi-
ments the clipbar can be incorporated into other software applications, for example within a Web browser application. When the user wishes to clip a region of the document, the user accesses the clipbar and uses the options therein to mark or otherwise select one or multiple clips.

System (Clipbar) Copies Image of Rendered Document

Since the user-defined region of interest is specified with respect to the rendered and displayed image of a document, when a clip is created by the user, the system is able to create a color image copy of that portion of the user's display that corresponds to the specified region of the rendered document.

System (Clipbar) Copies Associated Document Structure

In addition to copying the image of the region of interest, the system also copies that portion of the document's structural description that corresponds to the region of interest. As described above, depending on the particular implementation, the system can clip and capture portions of documents within an application either via an application programming interface (API) that has been specified for that application and document type, or, if no API is available then by some alternate means. Some applications, including for example Internet Explorer, provide a suitable API (for example, the Internet Explorer DOM) which can be used by the system to interrogate the document structure. Other applications do not provide such a DOM or API. In those implementations in which an API is not available, the system can determine a structure by analytical means, such as by character recognition, image segmentation, and similar image processing techniques. In accordance with one embodiment, the system determines the structure associated with a region of interest by implementing the clipbar as an extension to a document viewer which can access the underlying structure of the displayed document directly. For example, the clipbar can be added as an extension to a Web Browser application such as Netscape Navigator or Internet Explorer. As described above, a Web Browser application parses HTML and other languages to create the rendered image which is then displayed to the user. When the user selects a region of interest in a Web browser, the system can interrogate the HTML or other code, and select that portion which corresponds to the region of interest.

For applications that do not define a standard way to add an extension, different methods for extracting underlying structure associated with a region of interest may be used. One strategy is to take advantage of the copy/paste function supported by most applications. For example in the Adobe Acrobat software application, users can copy text by highlighting it with the mouse and by copying the selected content to the clipboard using Ctrl-C or a menu selection. Furthermore, in a Microsoft Windows environment the system can be notified when something is being copied into the clipboard. Also, the system can trap mousedown/mousedrag/mouseup events. In accordance with one embodiment, when the clipbar is activated, then on mousedown, i.e. when the the mouse button is depressed, the screen is captured. On mouseup, i.e. when the mouse button is released, the screen is captured again. If the clipboard is modified, the system can determine the area to clip by comparing the 2 images which had just been captured ("before" and "after" images), since applications usually graphically invert the color of the text/objects that are being selected. Using an image comparison technique it is easy to determine what areas of the image are different. Areas that have changed then define the clipping area.

Alternatively, the system can utilize the Y position of the mousedown and mouseup events to get the vertical bounding box of the clip, and can then set the width of the clipping area to the width of the active window. The textual content of the clip is then set to the content of the clipboard. Depending on the embodiment care can be taken to ensure that all flavors of the clipboard content are understood, since some applications (such as Microsoft Word) are able to copy the same selected content as multiple formats (for example as unformatted text, or as HTML).

Depending on the implementation, different algorithms can be used to evaluate the boundary conditions of the user-specified region of interest on the rendered document, and relate those boundary conditions back to a subset of the document's underlying structure. Different techniques may be required to support different types of selections, depending on the type of document and on its associated structure. In accordance with one approach, any object in the document's structure with a rendered region that overlaps the region of interest may be considered to belong to the clip. Alternatively, only those objects that intersect the region of interest by more than a particular percentage of their rendered area may be considered to be part of the clip. Alternative approaches and algorithms may be appropriate for time-varying documents so that, for example, portions of an animation may be extended for a period of time prior to the specified region of interest to account for the lag time that is typically encountered when a user is trying to specify an offset in time-varying media.

Rendered Image and Document Structure are Stored as a Clip

Once selected, the rendered image or image portion, and its associated document structure, are stored as a clip, or as a collection of clips. The clips may be saved in temporary storage (memory), to a fixed storage, or to a database or other storage. The clips may be redisplayed to create a customized document display, or may be repurposed for use in other applications. Clips may be redistributed among groups of users to create a collaborative presentation environment.

System Architecture

Figure 2:
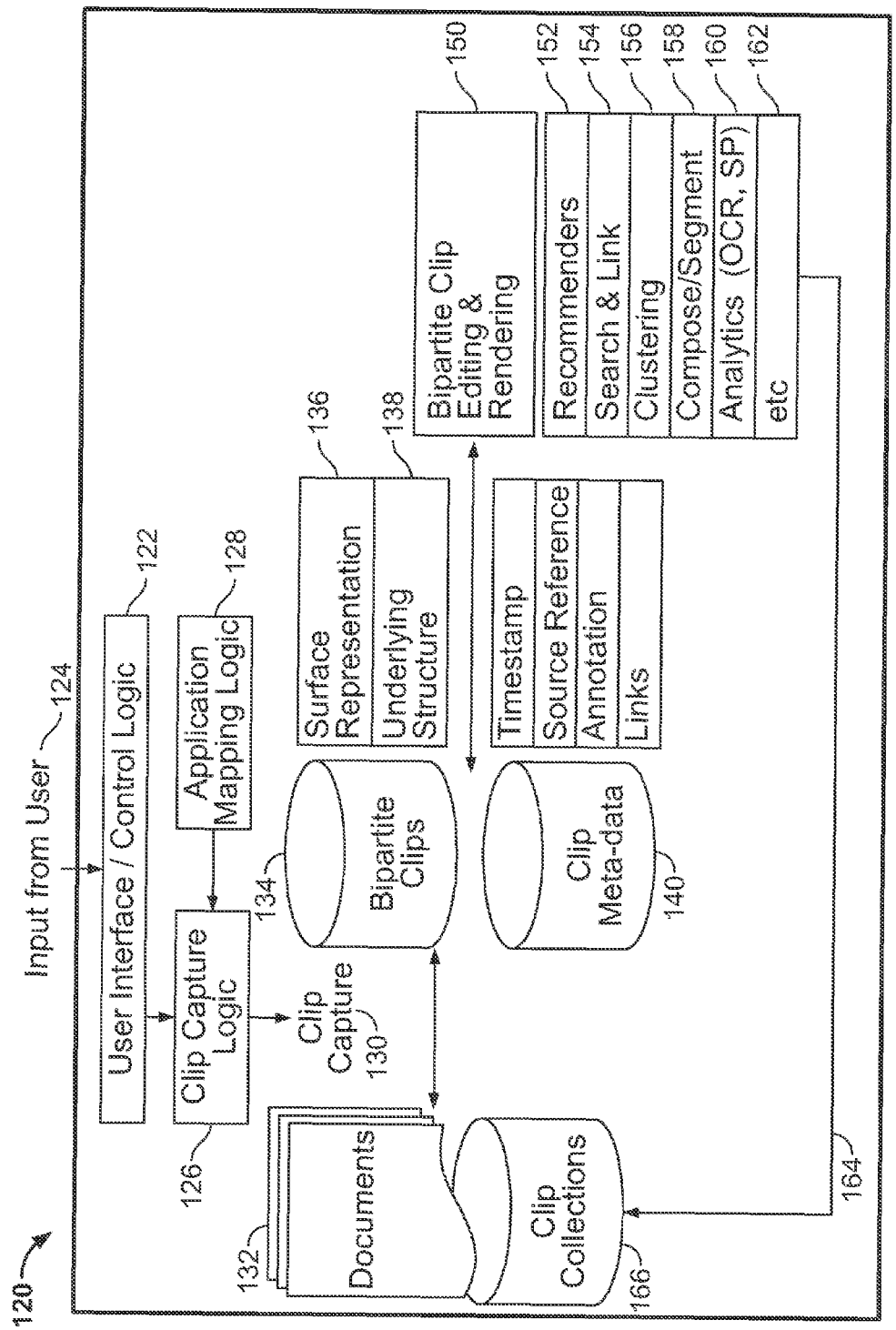
FIG. 2 shows a logical diagram of a system in accordance with an embodiment of the invention for repurposing and augmenting document content by clipping, annotating, and reassembling portions of documents.

FIG. 2 shows a logical diagram or architecture of a system in accordance with an embodiment of the invention for repurposing and augmenting document content by clipping, annotating, and reassembling portions of documents. As shown in FIG. 2, the system 120 includes a user interface or control logic 122 that accepts input from a user 124 as the user views or manipulates documents 132. The documents themselves may be internal external to the system, or may be a combination of both internal and external documents. In particular, in an online or Internet environment the documents may initially be online (i.e. external), including Web pages, which are then clipped to create new documents that are stored internally to the system. A clip capture logic 126 is provided for allowing a user to specify a clip or a series of clips 130 from the documents, wherein each clip is then stored as a bipartite clip 134. The clip capture logic may be programmed using an appropriate software programming. The clip capture logic interacts with an application mapping logic 128 to interpret the clipping actions of users into a determination of the association between a portion of the rendered document 136 and the associated underlying structure 138. The application mapping logic may similarly be programmed using an appropriate software programming. Optionally, the documents may be stored with associated clip meta-data 140, including for example a clip time-stamp 142, a clip source 144 reference, an annotation 146, or other links 148. This meta-data can be used for subsequent indexing, referencing and searching among large collections of clips. A clip editing and rendering module 150 normalizes the document structures into a common form and where necessary invokes the appropriate method of the application program interface (API) to manipulate text or other entities within the clips. Such API's may include interfaces to recommenders 152, searching and linking 154, clustering 156, compose and segment 158, analytics (optical character recognition etc) 160, and other interfaces 162. In this manner the user, or other users may augment the information stored with the clip to add useful information. The complete clip information is then stored 164 as a clip collection 166, or added to an existing clip collection, from which the modified documents may subsequently be retrieved and the process repeated again as desired.

It will be evident that the logical structures and processes shown may be implemented in software as a single server entity, and may not necessarily match that shown in FIG. 2. Other implementations may be developed according to one of skill in the art and within the spirit and scope of the invention.

Clip Capture Process

Figure 3:
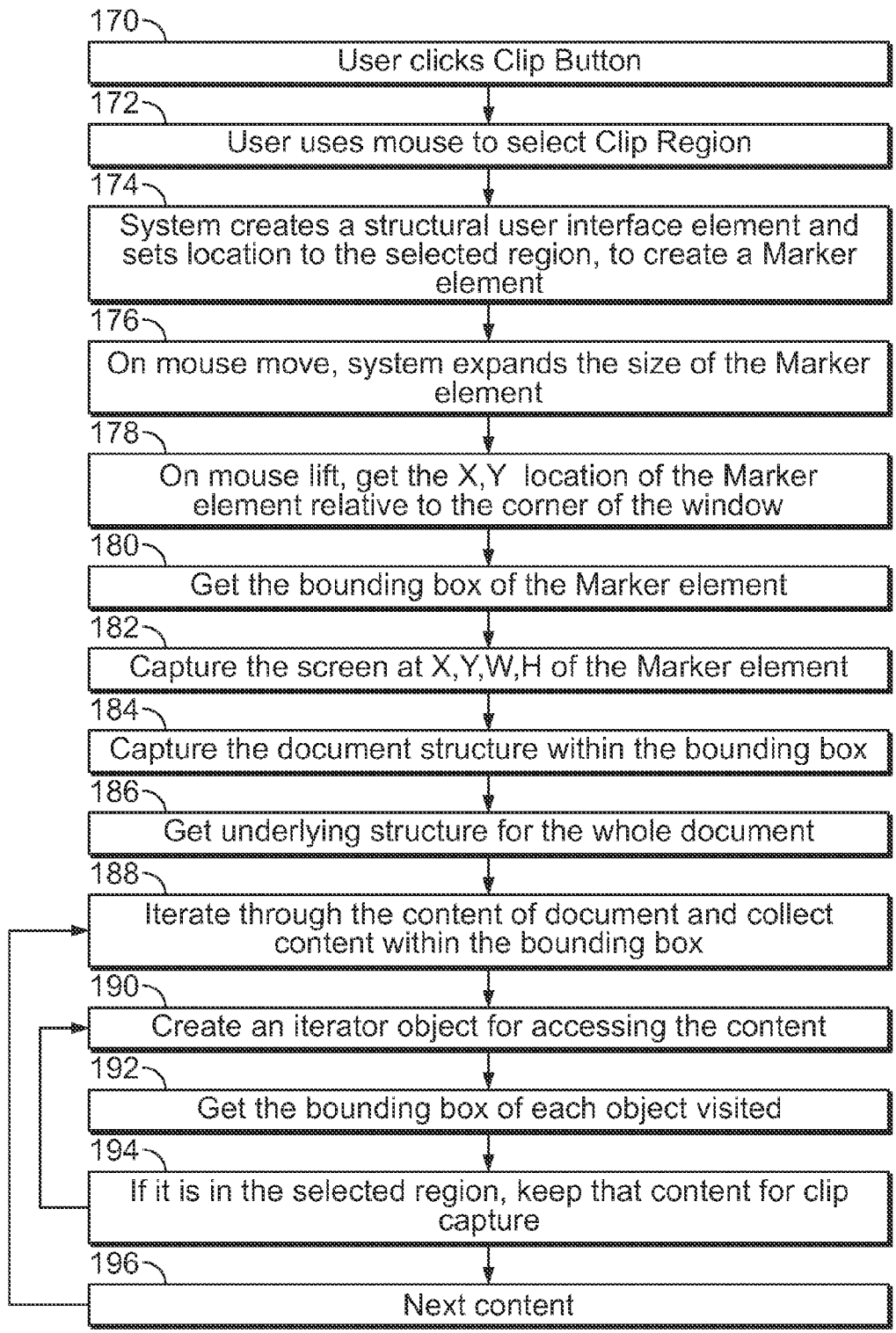
FIG. 3 shows a flowchart of a method in accordance with an embodiment of the invention for determining the underlying substructure of a document content and associating it with a clip.

This section provides a more detailed view of the clip capture process outlined in FIGS. 1 and 2. FIG. 3 shows a flowchart of a method in accordance with an embodiment of the invention for determining the underlying substructure of a document content and associating it with a clip. In step 170, the user of a graphical interface and window displayed thereon accesses the clipbar device and clicks a "clip" button or similar control. In step 172, the user uses their mouse to select a clip region within the graphical image displayed on the window. In step 174, the system creates a structural user interface element and sets the location to the selected region. This creates a marker element. In step 176, on moving the mouse the system expands the size of the marker element. In step 178, upon releasing the mouse button the system gets the X, Y location or equivalent screen coordinates of the marker element relative to the corner of the window. In step 180, the system gets the bounding box of the marker element. In step 182, the system captures the screen at X, Y, W, H of the marker element. As an interim step the screen image at these coordinates may be stored in memory for subsequent use. In step 184, the system interrogates the document structure corresponding to the image within the bounding box. In step 186, the system gets the underlying structure for the entire document. In steps 188 through 196, the system cycles through each content within the bounding box. Particularly, in step 188 through 196 the system iterates through the content of the entire document and collects that content corresponding to the bounding box. In steps 190 through 194, the system creates a text iterator object for accessing the content, gets the bounding box of each object visited, and if the object is in the selected region, keeps that content for clip capture. The clipped image, together with the underlying structure can be stored in a clip for subsequent re-use and repurposing.

ClipBar Applications

Figure 4:
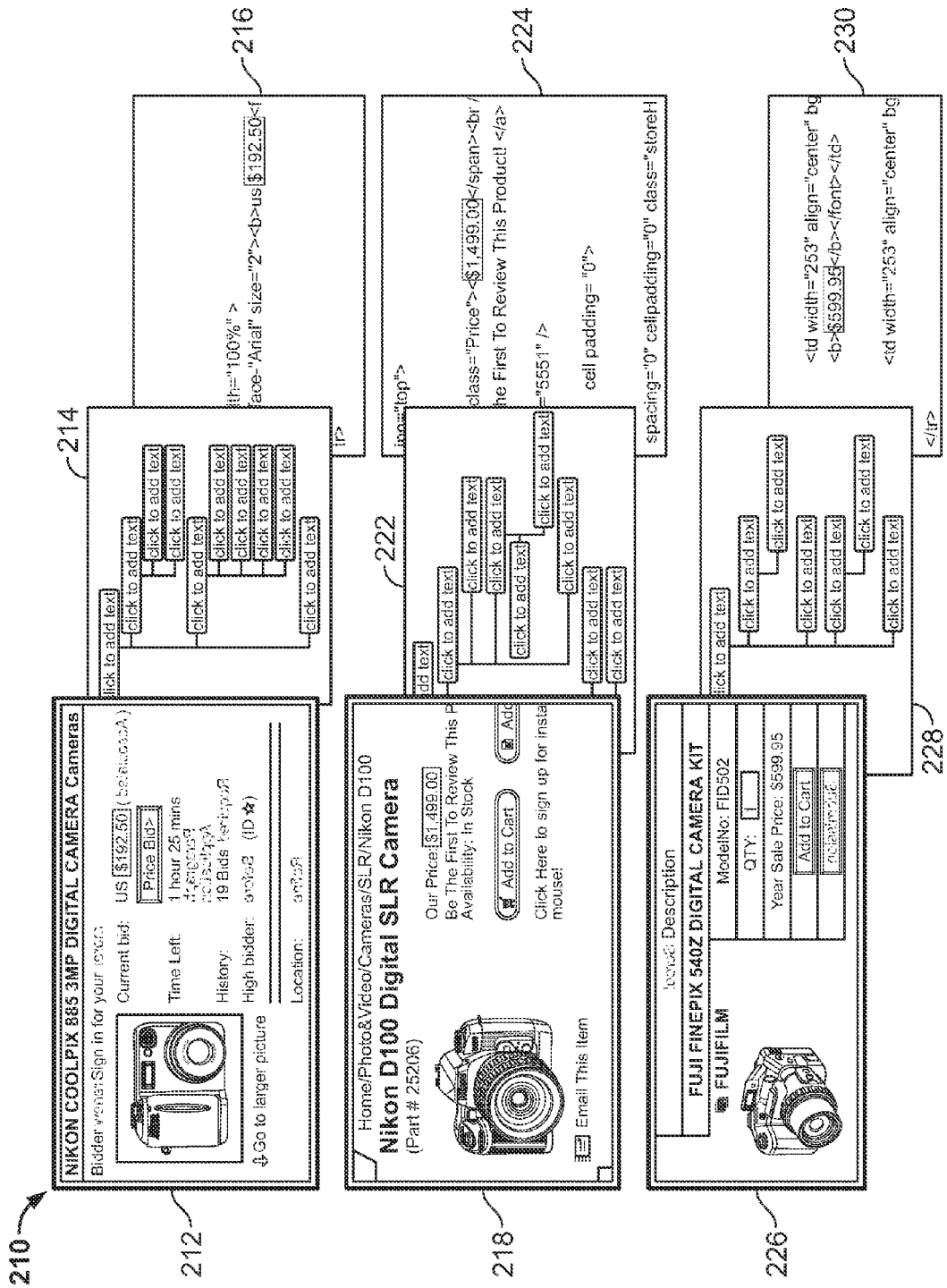
FIG. 4 shows an illustration of an online content as it may be clipped, repurposed or augmented in accordance with an embodiment of the invention.

In accordance with various embodiments, the clipbar system can be used in a variety of additional applications. One example is that of reordering clips. FIG. 4 shows an illustration 210 of an online content as it may be clipped, repurposed or augmented in accordance with an embodiment of the invention. As shown in FIG. 4, three clips have been created from different Web pages as a user/person is shopping for a digital camera. Correspondences can be determined between the text or content in the image 212, 218, 226, (which in this instance are shown as rendered fragments, including jpeg images), and the text in the underlying document structure 216, 224, 230 (which in this instance are shown as HTML code). An examination of the underlying structure 214, 222, 228, such as the Domain Object Model (DOM) can yield bounding boxes of each word in the document fragment and the associated portion of the image fragment. As described above, this process works whenever there is an explicit defined structure within a document that is accessible to the system through an application interface such as the DOM API. Whenever there is no explicit structure, the system can still determine a structure by analytical means, such as by character recognition, image segmentation, and similar image processing techniques. Once correspondences 214, 222, 228 are determined between words in the image and the document structure, edits to the document structure can be reflected in edits to the image. For example, it is possible to automatically reorganize the clips (for example, to automatic sort clips of ads by price). Because the rendered fragments are stored with the image and the structure together, people can easily appreciate and remember the context of the clipped information. Moreover, users can indicate regions of interest within each rendered fragment, which can be mapped to the structural representation.

Figure 5:
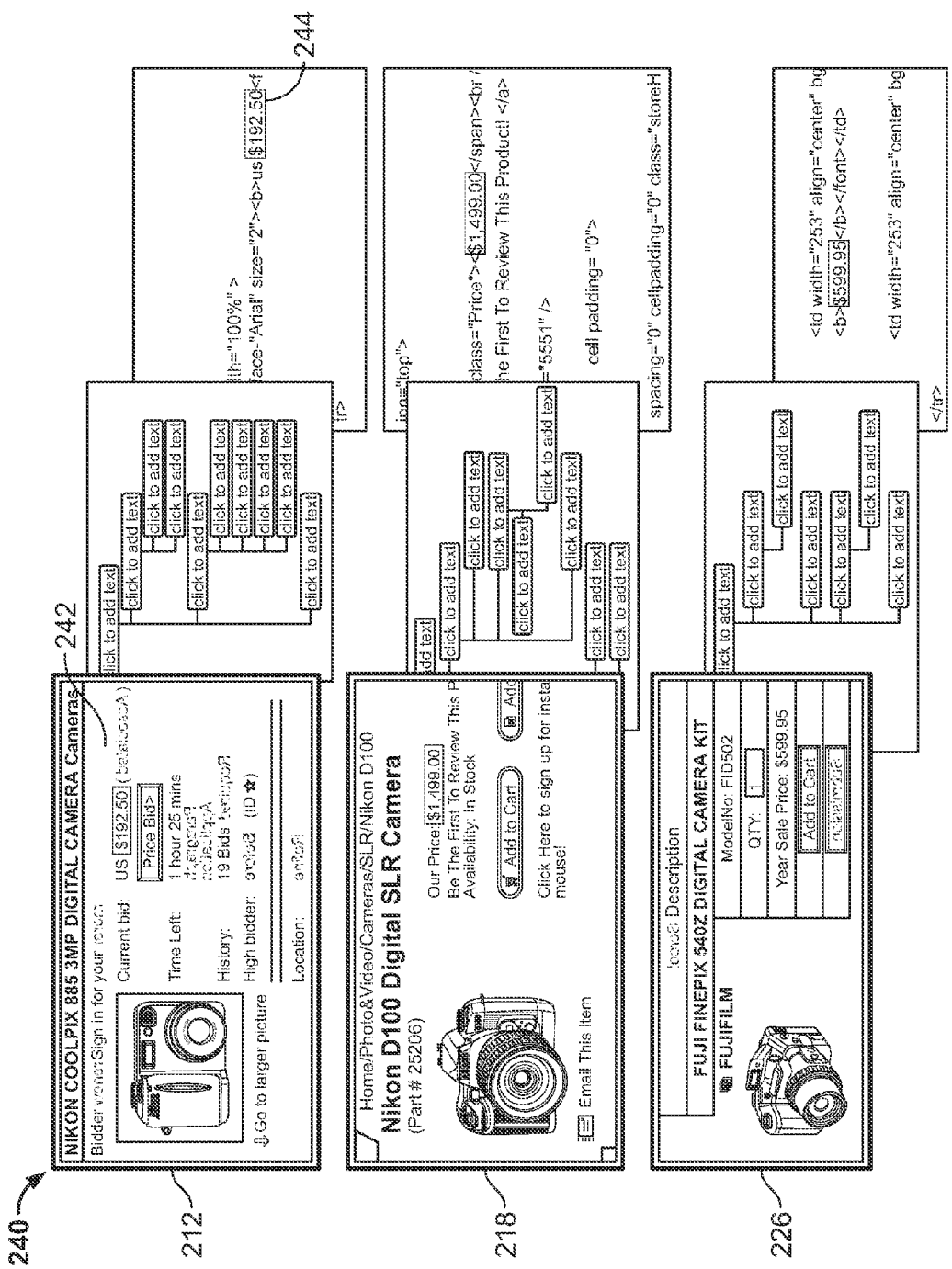
FIG. 5 shows an illustration of the clips of FIG. 4 mapped to the underlying substructure of the online content, in accordance with an embodiment of the invention.

FIG. 5 shows an illustration 240 of the clips of FIG. 4 mapped to the underlying substructure of the online content, in accordance with an embodiment of the invention. In FIG. 5, the user has highlighted portions 242 of each rendered fragment that correspond to the price of each camera. The clipbar can map the highlighted areas to the associated text 244 in each document's underlying structure. Users can then perform arbitrary operations involving computations on or with the underlying structure.

Figure 6:
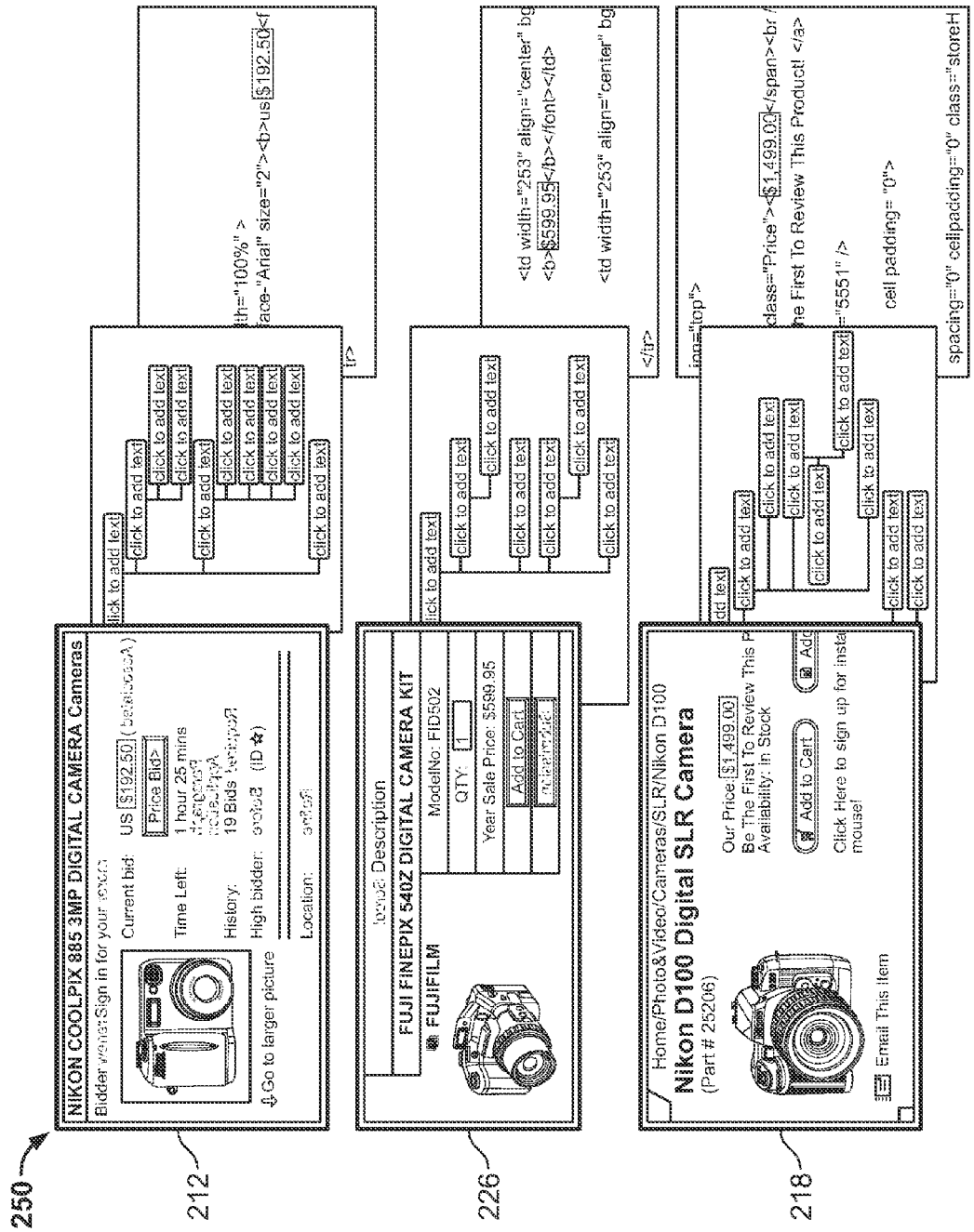
FIG. 6 shows an illustration of the clips of FIG. 4 as they may be sorted, in accordance with an embodiment of the invention.

For example, FIG. 6 shows an illustration 250 of the clips of FIG. 4 as they may be sorted, in accordance with an embodiment of the invention. In FIG. 6, the clipbar has determined a new linear order for the clips by sorting the camera prices. The new linear order could then be used to re-order the clip collection so that the images of the cameras are ordered, for example, by their price.

Figure 7:
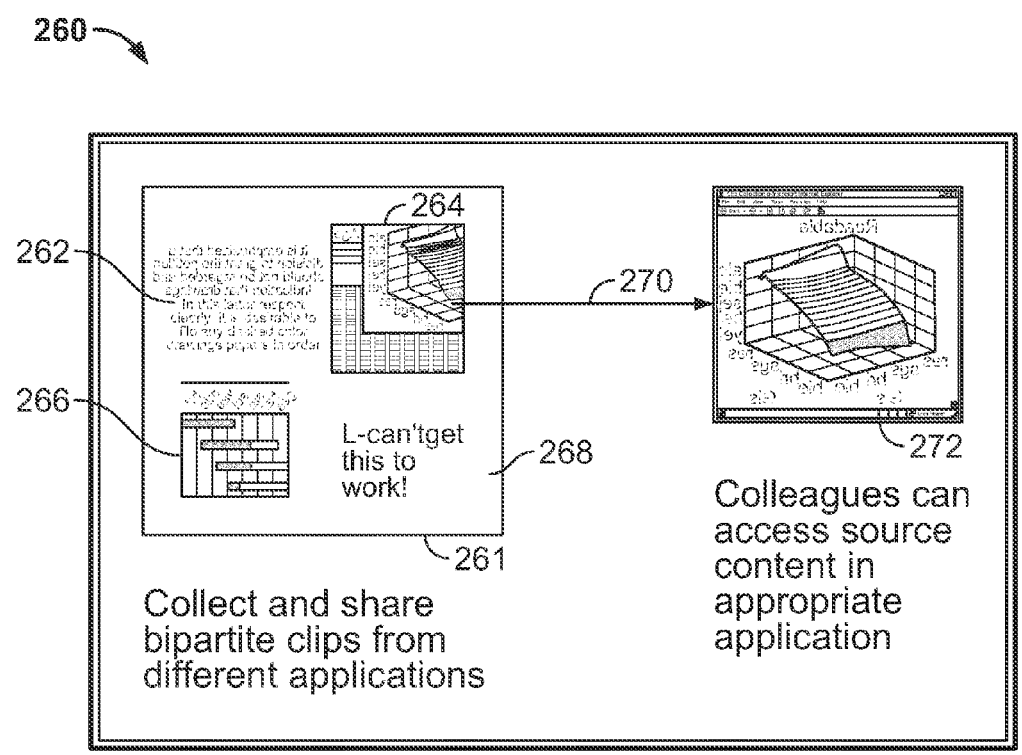
FIG. 7 shows an illustration of an application content as it may be clipped and used in a collaborative environment, in accordance with an embodiment of the invention.

Other examples of capabilities created by combining both image and structure may involve allowing users to manipulate the structures directly to effect changes in the rendering. For example, a text editing interface may be provided for users that allow them to remove extra words from the image by removing the associated extra words of text. In general, arbitrary operations can be performed on the clips, and the results mayor may not be reflected back into the re-rendering of the clip collection. Possible operations are limited only by the types of documents, their structural representations, and their potential for interoperability. It should be noted that although the clips in the examples shown in FIGS. 4, 5, and 6, are all portions of Web pages and therefore share a common internal structure and representation, the invention may be generalized to work with other formats and sorts of documents. For example, FIG. 7 shows an illustration 260 of an application content as it may be clipped and used in a collaborative environment, in accordance with an embodiment of the invention. In FIG. 7, a user has created a clip collection 261 from different types of applications (in this example a mail client 262, a spreadsheet 264, and a workflow application 266). The clips may be collected with an annotation 268, and transferred 270 to a colleague who can access the source content in the appropriate application program 272. Although the clips are from different applications and their associated structure is stored in different forms, since the rendered portions of the documents are associated with the appropriate underlying structure and the underlying structures may be manipulated in a common general manner, the clips are readily shared between users while the visual appearance of the clip is preserved. Many applications have well defined interfaces (APIs) that can be used to map regions of their rendered form into subsets of their structure. These may include, for example, Web browser APIs, that can be used to translate selections on a rendered document to subsets of the associated DOM. Microsoft Office applications also have object models and associated APIs for translating selections on the rendered representations into associated substructures. Other application types may be supported by exposing their API's for use by the system in interrogating the underlying structure of the document.

In some embodiments, for those applications that do not support object models and APIs, it is possible to approximate a mapping of selections on the rendered representations into associated substructures. In general, there are at least two different methods for providing this functionality: 1) translating each of the forms of underlying structure into a common representation and 2) providing appropriate APIs for each form of structure to support the appropriate mappings and operations. In accordance with an embodiment, whenever there is no explicit structure (for example, in the case of a displayed bitmap image), the system can determine a structure by analytical means, such as by character recognition, image segmentation, and similar image processing techniques. From the perspective of the user, the result is similar in that the OCR'ed clip provides, for example, an ability to search clips by content, or the ability to extract portions of the clips. Using an application-independent extraction means such as OCR makes the ClipBar itself application independent.

ClipBar Collections

Whether or not a common representation can be obtained for all of a clip collection's associated structures, it is highly desirable for clipbar to provide a version of the clip collection that can be rendered in a form just like any other input document. In accordance with one embodiment the system automatically stores clips as new documents. For example, when HTML documents are used, the system stores collections as new HTML-accessible documents. By automatically storing collections of clips as a new document, the clipbar does not require users to have to author a new document, or to be concerned with the authoring process. Eliminating authoring from the process of clipping and annotating makes it easier for users to focus merely on reading and understanding the content of documents.

Moreover, when collections can immediately be reclipped, clipbar can be used as a palimpsest, i.e. a form of reusable content media that can be written, accessed, and rewritten at will, by a variety of users. In this manner, the clipbar and its associated documents can provide a theoretically infinite amount of commentary and metacommentary (and meta-meta-commentary, etc.).

The clipbar can be used for enhancing BLOGs, (popular Web logging facilities that support communities of commentators). With clipbar people's comments could refer directly to rendered copies of documents, and to rendered copies of comments about rendered copies of documents, etc.

In accordance with various embodiments, additional extensions to the clipbar are possible by reconsidering the way in which clips are collected. It may be possible for clips to be automatically clustered together into collections using standard textual categorization techniques. The text of any clip or collection can be used as a query to quickly identify similar clips. Alternatively, instead of collecting clips in a database or a new document, some embodiments can be used to "publish" a clip or a clip collection to a printer, or to an email address. In this way a user of a public touch screen, such as that used in the Plasma Poster Network system from the FX Palo Alto Laboratory, or any equivalent touch screen device, could clip a portion of a posting, add an annotation, and print the clip, or send it to a colleague via email.

ClipBar Browser Implementation

In accordance with an embodiment, the clipbar can be implemented as an extension to an Internet Explorer Web browser. An initial application of this system is to provide a more flexible authoring system for the Plasma Poster Network system, a system of large public touch screens developed by the FX Palo Alto Laboratory, that display a continually-changing sequence of interactive Web content. The content can be created by "posting" URLs, images, movies, and textual comments via email. With the clipbar, it is easy for people to create a posting of a portion of a Web page or multiple portions of multiple Web pages complete with their associated comments. Because the clipbar automatically combines multiple clips into a single Web page, the authoring of Plasma Poster postings is greatly simplified.

Figure 8:
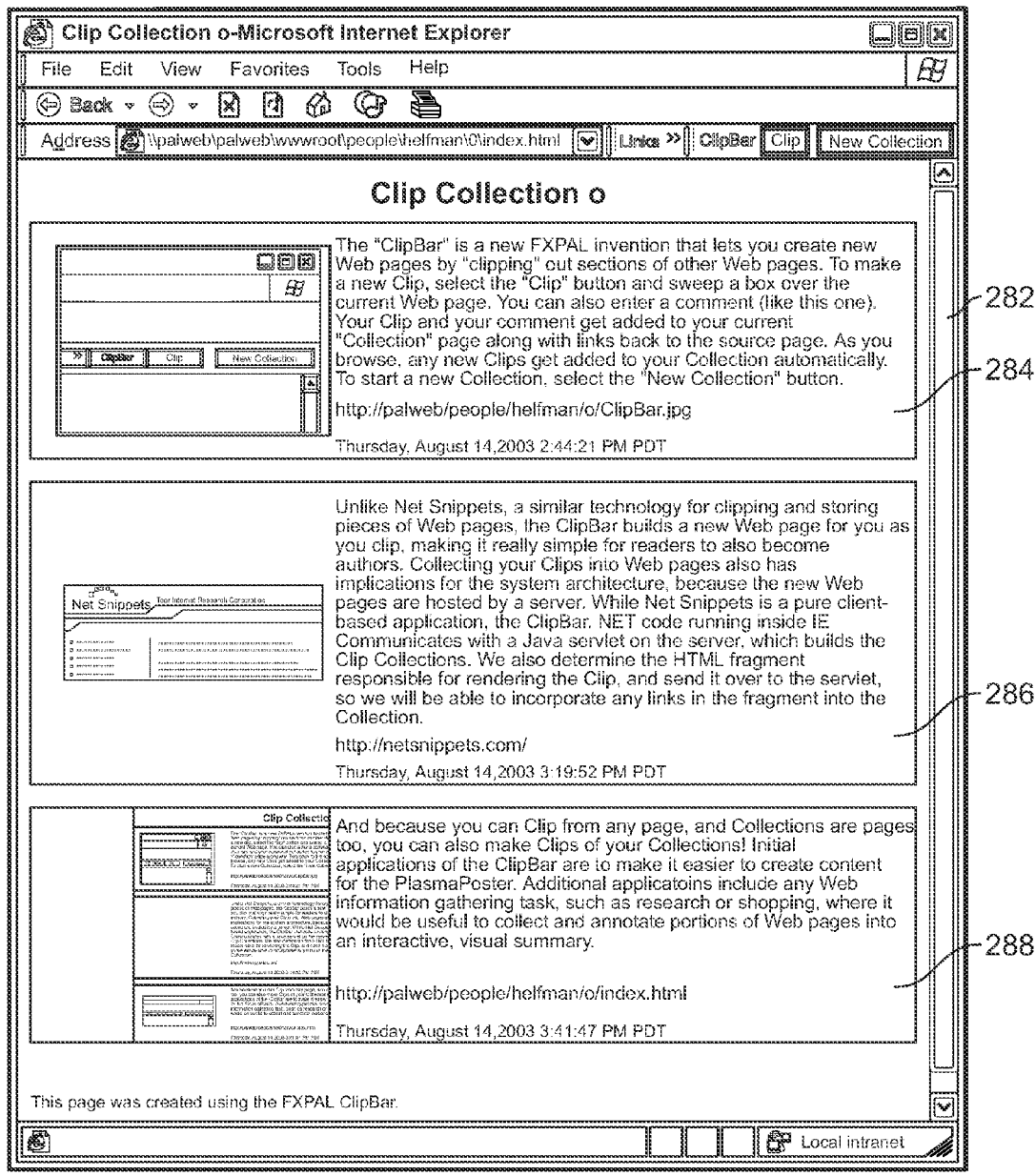
FIG. 8 shows an illustration of a collection of clips as they may be used for repurposing and augmenting document content, in accordance with an embodiment of the invention.

As an Internet Explorer extension, the embodiment has access to the Document Object Model (DOM) description of the displayed document, allowing the clipbar to utilize a DOM API to determine the portion of the document's underlying structure that corresponds to the user-defined region of interest. After indicating a region of interest, a user of the clipbar is prompted for an optional comment. The clipbar then stores the information associated with the clip: the user's comment, the image of the user-defined region of the rendered document, the portion of the document's underlying structure that corresponds to the user-defined region of interest, and meta-data about the clip, such as the date and time of the clipping and the URL and or title of the source document. In a preferred embodiment of the invention, the clip information can be stored on a server in a database. Alternatively, the clip information is stored in an HTML document, which is stored on a Web server so that it can be accessed over the Web, just like any other Web page. For example, FIG. 8 shows an illustration 280 of a collection of clips as they may be used for repurposing and augmenting document content, in accordance with an embodiment of the invention. The clipped content is displayed as a new Web document 282. Image fragments 284, 286, 288 are implemented as Web hyper-links that, when selected, will open a connection to the source Web page in new browser window. This embodiment uses a fixed layout for clip collections; other embodiments may support editing of the text associated with each clip and layout customization of the entire clip collection.

Figure 9:
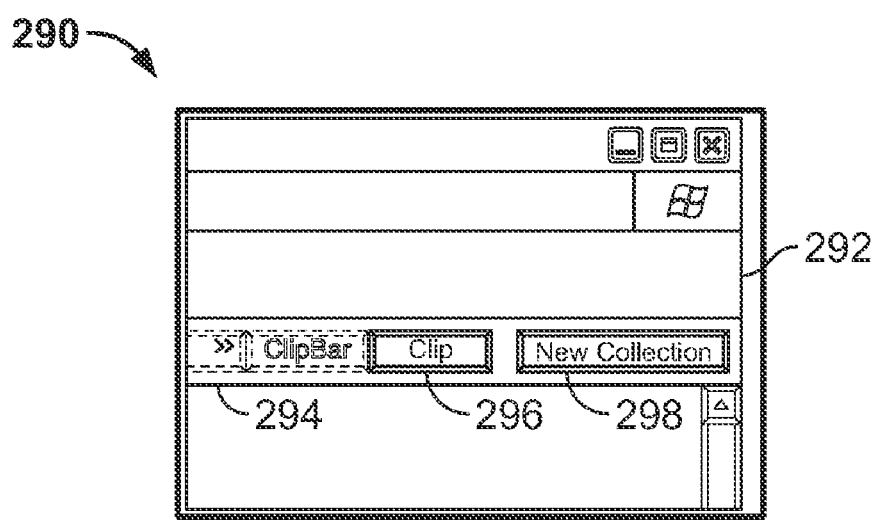
FIG. 9 shows an illustration of a clipbar menu and clip collection control device in accordance with an embodiment of the invention.

Users of the clipbar are given control over which collection a particular clip should be associated with. This control may be exercised before, during, or after the clipping is specified. Depending on the implementation only minimal control may be provided for associating a clip with a collection: by default clips are associated with a single "current" collection and a new current collection may be started at any time by selecting the "New Collection" button. For example, FIG. 9 shows an illustration 290 of a browser 292 having a clipbar menu 294 or clip collection control device in accordance with an embodiment of the invention, that allows the user to create clips 296, or create new collections 298. In other embodiments, greater control can be provided such that a new clip could be associated with any existing collection.

In accordance with an embodiment, the clipbar is implemented by combining JavaScript and C#.NET code for augmenting Internet Explorer, with a Java servlet for accumulating clips, annotations, and meta-data into new Web pages. An addin module is provided for Internet Explorer, using any appropriate language such as C#. This module has access to the DOM of the web page currently loaded in the browser. Furthermore, it has access to all events that are signalled by the underlying web page renderer. Two events are of particular interest: an OnDocumentComplete event fires when the page has finished loading. When the addin receives this event, it dynamically adds a JavaScript code in the web page. This JavaScript code overwrites the mouse event handlers: the onmousedown function starts a new SPAN element at the current x,y position of the mouse; the onmousedrag function modifies the size of this SPAN element so that users can size the SPAN element. The SPAN element has a transparent color but is drawn with a border so that users can see its boundaries. Finally, the onmouseup function retrieves the elements of the web page that are located underneath the SPAN element. The system creates a range object spanning the whole body of the document and changes the focus of this range word by word. At every step, the system gets the bounding box of the word and tests if it intersects with the bounding box of the SPAN, in which case this word is added to the selection. The first word and last word intersecting the SPAN are then used to retrieve the HTML text. Finally, the JavaScript code communicates with the addin by modifying the status of the window because the addin receives an event every time the status text is modified. This mechanism is used to communicate the bounding box of the SPAN, the URL of the document being clipped and the HTML text selected by the box. The addin then grabs the screen at the bounding box and saves it as a JPEG image. It then sends the data to the servlet using the HTTP POST protocol.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, while the embodiment of the system is described in combination or use with the Internet Explorer system, other browser and graphical user interface devices and applications may be used. Similarly, other formats of documents in addition to HTML may be understood and clipped. Furthermore, while many examples describe an explicitly defined document structure accessed through an application interface, the system may also be used with documents lacking such explicit structures, in which instances the system can determine a structure by analytical means. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system including a processor for dynamic capturing and publishing of clipped document content, comprising:
   a clip capture logic that receives, via a graphical user interface, a request from a user to select a portion of a displayed image within an application, said displayed image being a graphical rendering of a content structure and said portion being defined by the user;
   wherein the clip capture logic creates a substantial copy of the portion of the displayed image selected by the user;
   an application mapping logic that determines elements of the content structure that correspond with the selected portion of the displayed image, wherein the application mapping logic captures the determined elements of the content structure;
   a database that stores, as a plurality of clips, the substantial copy of the portion of the displayed image selected by the user, together with the captured elements of the content structure associated with the substantial copy of the portion of the displayed image selected by the user;
   and a publishing logic that publishes said clips; wherein the application mapping logic receives a request from the user to select a region of interest within the substantial copy of the portion of the displayed image; wherein the application mapping logic maps the selected region of interest to the elements of the content structure associated with the selected region of interest; and
   wherein the application mapping logic edits a graphical rendering of the selected region of interest within the substantial copy of the portion of the displayed image by editing the mapped elements of the content structure associated with the selected region of interest.

2. The system of claim 1 wherein the application mapping logic uses an application program interface to determine a portion of the content structure that corresponds with the selected portion of the displayed image.

3. The system of claim 1 wherein the application mapping logic uses analytical means to determine a portion of the content structure that corresponds with the selected portion of the displayed image.

4. The system of claim 3 wherein said analytical means include any of character recognition and image segmentation of the selected portion of the displayed image.

5. The system of claim 1 wherein the graphical user interface is operated at a client, and wherein the application mapping logic and database are stored and executed at a server.

6. The system of claim 1 wherein the graphical user interface is operated at a client, and wherein the clip capture logic is stored and executed at a client, and wherein the application mapping logic and database are stored and executed at a server.

7. The system of claim 1 wherein the system allows for clipping of online content, wherein the graphical user interface is a Web browser, wherein the displayed image is Web content displayed within said browser, and wherein the content structure is the html code associated with the Web content.

8. The system of claim 7 wherein the Web browser includes controls for operation by the user in selecting the portion of the displayed image to be stored as clips.

9. The system of claim 1 wherein the system includes extensions for use by said application mapping logic to recognize an application's content structure, and wherein additional extensions may be added for new application types.

10. The system of claim 1 wherein the substantial copy of the portion of the displayed image is stored as rendered fragments of the original displayed image.

11. The system of claim 1 further comprising:
   a publishing logic that publishes said clips as online content for subsequent viewing and selection by the user.

12. The system of claim 11 further comprising:
   a touch screen display that display published clips as online content for subsequent viewing and selection by a user.

13. The system of claim 12 wherein clips may be published to a specified collection, and wherein that collection is displayed on the touch screen display.

14. The system of claim 13 wherein the display is automatically updated with new clips as clips are published to the collection.

15. The system of claim 1 wherein annotations may be added by the user and stored with a clip.

16. The system of claim 1 wherein clips can be combined to form collections.

17. The system of claim 1 wherein clips can be re-clipped to form additional clips.

18. The system of claim 1 wherein clips can be stored with system specified or user-specified metadata.

19. The system of claim 1 wherein the content structure is XML code.

20. The system of claim 1 wherein the content structure comprises boundary conditions of the selected portion of the displayed image.

21. The system of claim 1, further comprising:
   a clip editing and rendering module that normalizes the content structure associated with the selected portion of the displayed image into a common form and invokes a method of an application program interface to manipulate text and other entities within the clips.

22. A method for dynamic capturing and publishing of clipped document content, comprising the steps of:
   receiving, via a graphical user interface, a request from a user to select a portion of a displayed image within an application, said displayed image being the graphical rendering of a content structure and said portion being defined by the user;
   creating a substantial copy of the portion of the displayed image selected by the user;
   determining elements of the content structure that correspond with the portion of the displayed image selected by the user;
   capturing the determined elements of the content structure;
   storing, as a plurality of clips, the substantial copy of the portion of the displayed image selected by the user, together with the captured elements of the content structure associated with the substantial copy of the portion of the displayed image selected by the user; and publishing said clips for subsequent viewing and selection by the user;
   receiving a request from the user to select a region of interest within the substantial copy of the portion of the displayed image;
   mapping the selected region of interest to the elements of the content structure associated with the selected region of interest; and
   editing a graphical rendering of the selected region of interest within the substantial copy of the portion of the displayed image by editing the mapped elements of the content structure associated with the selected region of interest.

23. The method of claim 22 including using an application program interface to determine the elements of the content structure that correspond with the selected portion of the displayed image.

24. The method of claim 22 including using analytical means to determine the elements of the content structure that correspond with the selected portion of the displayed image.

25. The method of claim 24 wherein said analytical means include any of character recognition and image segmentation of the selected portion of the displayed image.

26. The method of claim 22 wherein the graphical user interface is operated at a client, and wherein the application mapping logic and database are stored and executed at a server.

27. The method of claim 22 wherein the graphical user interface is operated at a client, and wherein the clip capture logic is stored and executed at a client, and wherein the application mapping logic and database are stored and executed at a server.

28. The method of claim 22 wherein the system allows for clipping of online content, wherein the graphical user interface is a Web browser, wherein the displayed image is Web content displayed within said browser, and wherein the content structure is the html code associated with the Web content.

29. The method of claim 28 wherein the Web browser includes controls for operation by the user in selecting portions of content to be stored as clips.

30. The method of claim 22 including using extensions to recognize an application's content structure, and wherein additional extensions may be added for new application types.

31. The method of claim 22 wherein the substantial copy of the portion of the displayed image are stored as rendered fragments of the original displayed image.

32. The method of claim 22 further comprising:
publishing said clips as online content for subsequent viewing and selection by the user.

33. The method of claim 32 further comprising:
displaying on a touch screen display published clips as online content for subsequent viewing and selection by a user.

34. The method of claim 33 further comprising:
publishing the clips to a specified collection, and wherein that collection is displayed on the touch screen display.

35. The method of claim 34 further comprising:
automatically updating the display with new clips as clips are published to the collection.

36. The method of claim 22 wherein annotations may be added by the user and stored with a clip.

37. The method of claim 22 wherein clips can be combined to form collections.

38. The method of claim 22 wherein clips can be re-clipped to form additional clips.

39. The method of claim 22 wherein the content structure comprises boundary conditions of the selected portion of the displayed image.

40. The method of claim 22, further comprising the steps of:
normalizing the content structure associated with the selected portion of the displayed image into a common form and invoking a method of an application program interface to manipulate text and other entities within the clips.

41. An online information storage system, comprising:
a user display device, including a graphical user interface for displaying thereupon an application having a displayed image, and that allows a user to select a portion of said displayed image, wherein said displayed image is the graphical rendering of a content structure and said portion is defined by the user; and
a storage system including:
a clip capture logic that creates a substantial copy of the portion of the displayed imaged selected by the user;
an application mapping logic that determines the particular elements of the content structure that correspond to the portion of the displayed image selected by the user, wherein the application mapping logic captures the determined elements of the content structure; and
a database that stores, as a plurality of clips, the substantial copy of the portion of the displayed image selected by the user, together with the captured elements of the content structure that corresponds to the substantial copy of the portion of the displayed image selected by the user;
wherein the application mapping logic receives a request from the user to select a region of interest within the substantial copy of the portion of the displayed image; wherein the application mapping logic maps the selected region of interest to the elements of the content structure associated with the selected region of interest; and wherein the application mapping logic edits a graphical rendering of the selected region of interest within the substantial copy of the portion of the displayed image by editing the mapped elements of the content structure associated with the selected region of interest.

42. A collaborative online content system, comprising:
a plurality of user display devices, each user display device comprising a graphical user interface for displaying thereupon a displayed image, and wherein each graphical user interface allows a user to select a portion of the displayed image, the portion being defined by the user; and
a collaborative publishing system including:
a clip capture logic that creates a substantial copy of the portion of the displayed image selected by the user;
an application mapping logic that determines the particular elements of the content structure that correspond to the portion of the displayed image selected by the user, wherein the application mapping logic captures the determined elements of the content structure;
a database that stores, as a plurality of clips, the substantial copy of the portion of the displayed image selected by the user, together with the captured elements of the content structure that corresponds to the substantial copy of the portion of the displayed image selected by the user; and
a publishing logic that dynamically publishes said clips as modified online content upon said plurality of user display devices for subsequent viewing and selection by the users; wherein the application mapping logic receives a request from the user to select a region of interest within the substantial copy of the portion of the displayed image; wherein the application mapping logic maps the selected region of interest to the elements of the content structure associated with the selected region of interest; and wherein the application mapping logic edits a graphical rendering of the selected region of interest within the substantial copy of the portion of the displayed image by editing the mapped elements of the content structure associated with the selected region of interest.

* * * * *